United States Patent
Dave et al.

(10) Patent No.: US 8,275,786 B1
(45) Date of Patent: Sep. 25, 2012

(54) CONTEXTUAL DISPLAY OF QUERY REFINEMENTS

(75) Inventors: Kushal Dave, New York, NY (US);
Casey Whitelaw, New York, NY (US);
Alexis J. Battle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/073,869

(22) Filed: Mar. 28, 2011

Related U.S. Application Data

(63) Continuation of application No. 11/695,177, filed on Apr. 2, 2007, now Pat. No. 7,917,528.

(51) Int. Cl.
*G06F 7/00* (2006.01)
*G06F 17/30* (2006.01)

(52) U.S. Cl. ....................................................... 707/766

(58) Field of Classification Search ........... 707/999.005, 707/766
See application file for complete search history.

(56) References Cited

U.S. PATENT DOCUMENTS

| | | | |
|---|---|---|---|
| 7,676,462 B2 * | 3/2010 | Kirkland et al. | 707/999.005 |
| 2006/0161520 A1 * | 7/2006 | Brewer et al. | 707/3 |
| 2008/0033982 A1 * | 2/2008 | Parikh et al. | 707/102 |
| 2008/0071740 A1 * | 3/2008 | Jhala et al. | 707/3 |

* cited by examiner

*Primary Examiner* — Robert Beausoliel, Jr.
*Assistant Examiner* — Nicholas Allen
(74) *Attorney, Agent, or Firm* — Fish & Richardson P.C.

(57) ABSTRACT

Systems and methods for providing refinements to queries based upon the context of a refinement indication. Refinements, for example, can be related to a previous search query and can be provided to the user based upon receipt of a refinement indication.

21 Claims, 8 Drawing Sheets

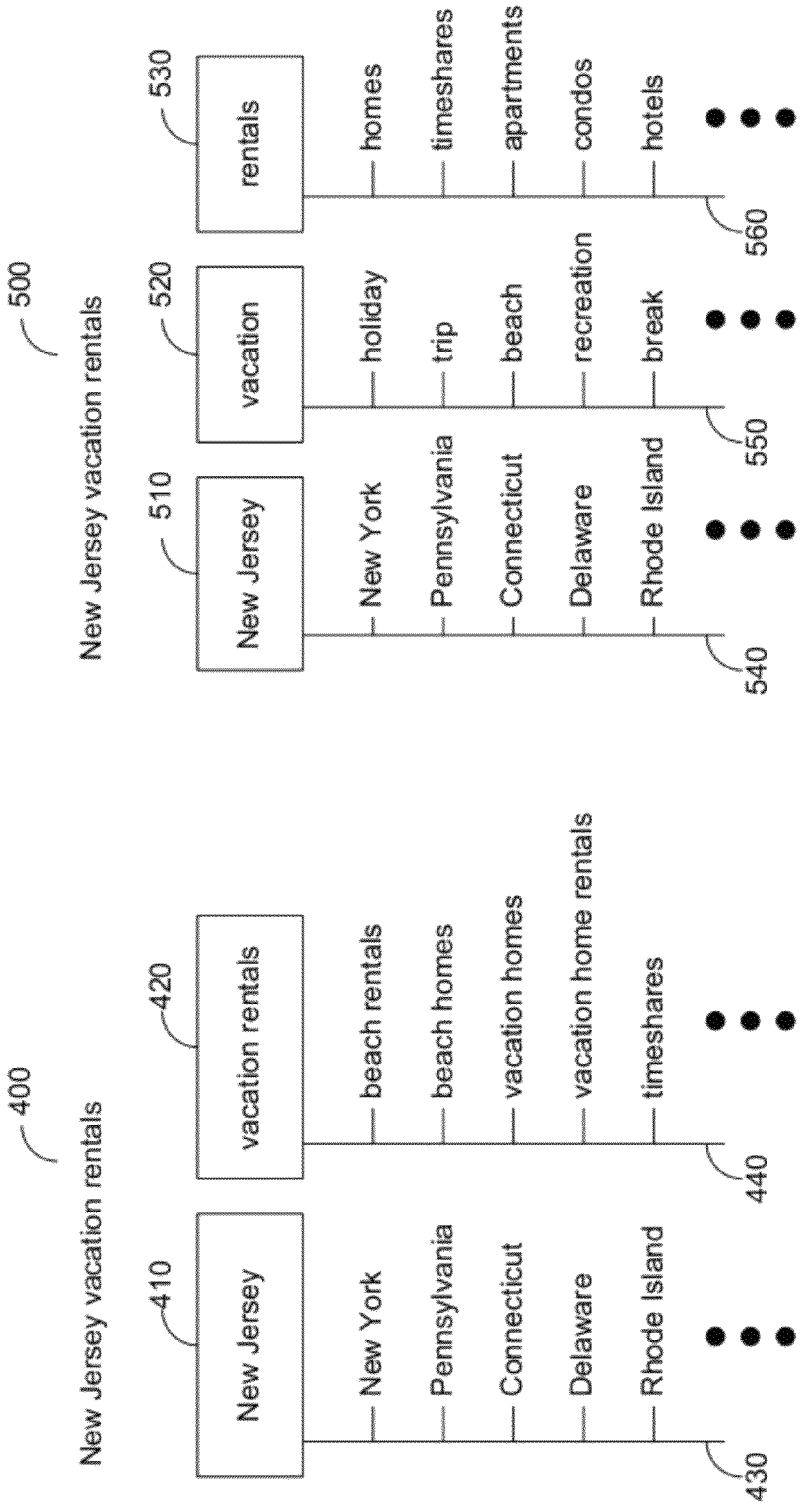

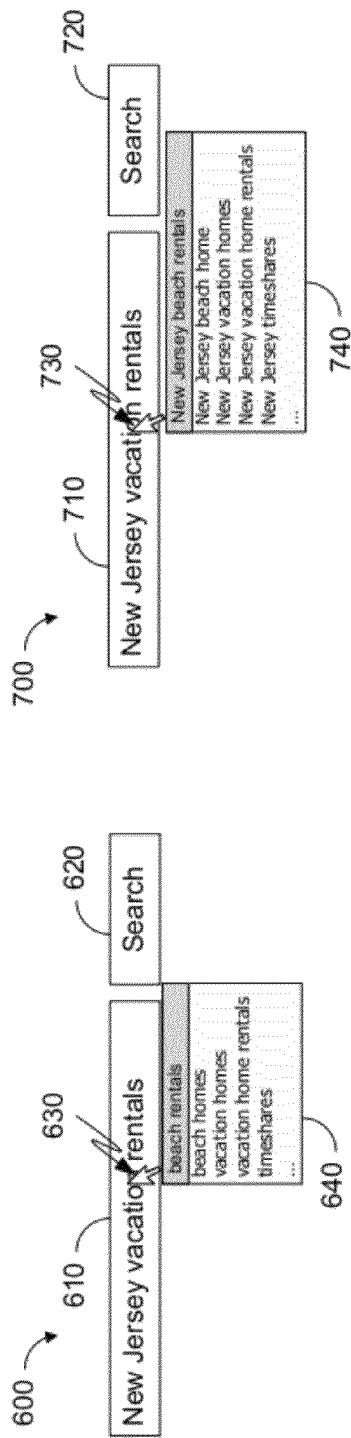
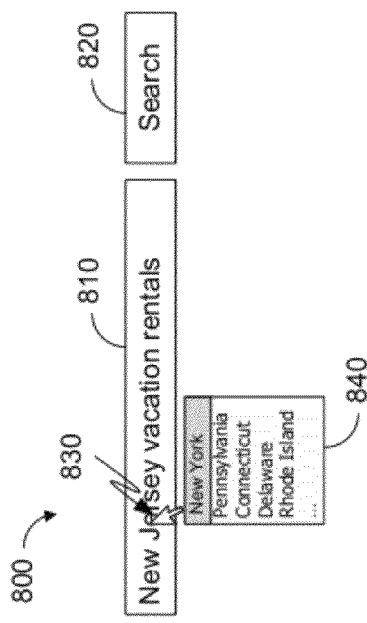
FIG. 6
FIG. 7
FIG. 8

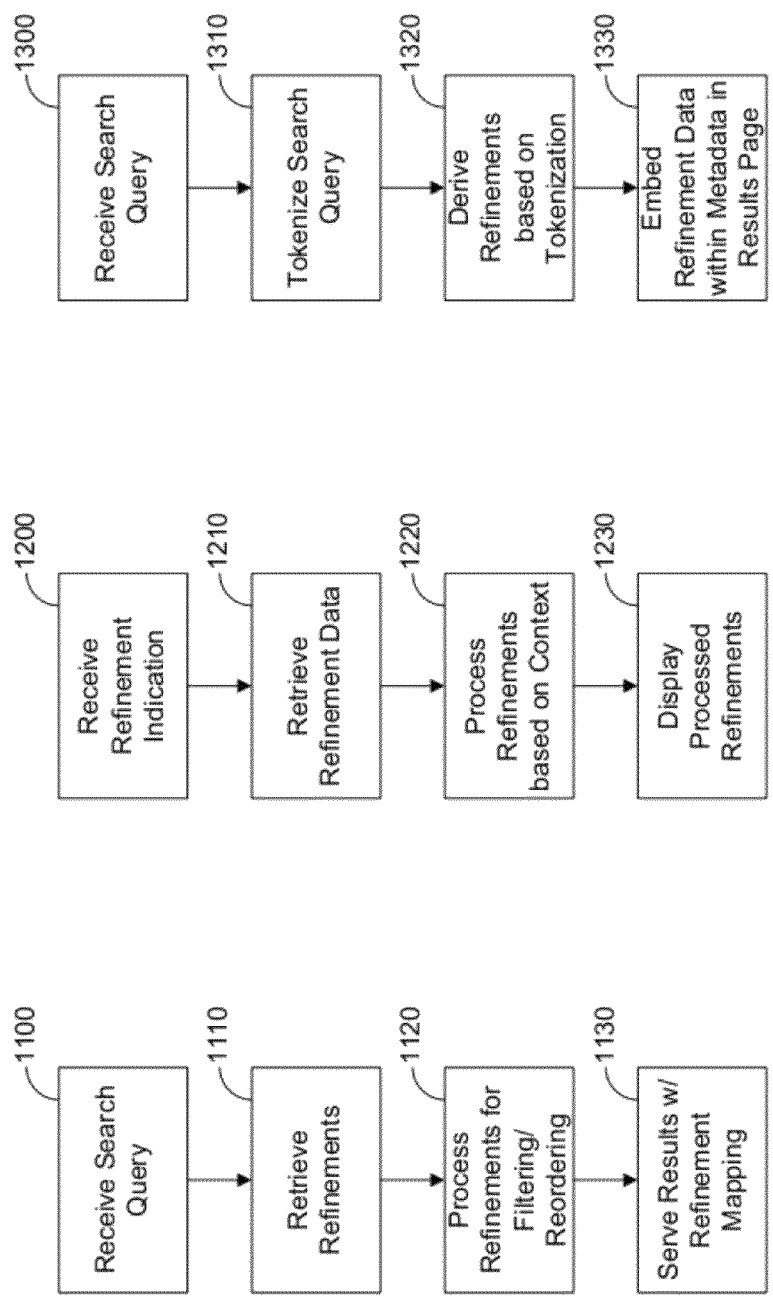

CONTEXTUAL DISPLAY OF QUERY REFINEMENTS

CROSS-REFERENCE TO RELATED APPLICATIONS

This application is a continuation of U.S. patent application Ser. No. 11/695,177, filed on Apr. 2, 2007, the entire contents of which are hereby incorporated by reference.

BACKGROUND

This disclosure relates to providing query refinements to users.

Large volumes of information can be accessed over the internet, and search engines are typically utilized to identify particular information, such as web pages, media files, etc. For example, a search engine can index the words included within each of the web pages and utilize such indexes to determine how relevant a page is to a received search query.

Some search engines can provide suggestions for a user entering a search query. For example, Google Suggest, available from Google Inc. of Mountain View, Calif., provides search suggestions to a user as the user is typing the search query. The suggestions are formed based on a tree that narrows as limitations are added to the query. The suggestions, for example, can be listed based upon the popularity of the search queries associated with the refinements in the refinement list. Thus, for example, search queries that are the most popular and match the partial query are more likely to be listed near the top of a refinement list, while the least popular queries that match a partial query are more likely to be listed near the bottom of a refinement list. Similarly, some search engines can provide suggestions, for example, in instances where a submitted search query is very broad, or where it is probable that a mistake (e.g., typo) was made in entering the search query.

SUMMARY

Systems and methods for providing refinements to queries based upon the context of a refinement indication. Refinements, for example, can be related to a previous search query and can be provided to the user based upon receipt of a refinement indication. In one implementation, a query refinement indication associated with a first search query can be detected, and a context associated with the query refinement indication can also be detected. One or more refinements to the first search query can be identified based upon the query refinement indication and the context associated with the query refinement indication.

In one aspect, methods are disclosed in which search refinements to a search are based upon context associated with a refinement indication received from the user.

Refinements described herein can provide suggestions to searchers who may not have enough knowledge of a subject to input the search terms that may result in the desired matches.

Refinements can also enable a searcher to efficiently refine search queries without spending time deliberating over search terms that might provide more relevant results identifying the documents most relevant to the subject for which the searcher is searching.

BRIEF DESCRIPTION OF THE DRAWINGS

FIGS. 4 and 5 are data structure diagrams illustrating example tokenization and refinement mappings for a search query.

FIGS. 6-11 are screen shots illustrating example environments that can be used to detect context for a search refinement and to provide contextual query refinements to a user.

FIGS. 12-14 are flowcharts illustrating example methods for providing contextual query refinements to a user.

DETAILED DESCRIPTION

Systems and methods of this disclosure can operate to provide query refinements to the user based upon a context associated with a refinement indication. The context of a refinement indication, for example, can be determined based upon a cursor position within a query string. The query string, in some examples, can be divided into tokens. The position of the cursor within one of the tokens can indicate which portion of the query string the user intends to refine. A refinement token, in some examples, can be associated with the token being replaced/refined.

Figure 1:
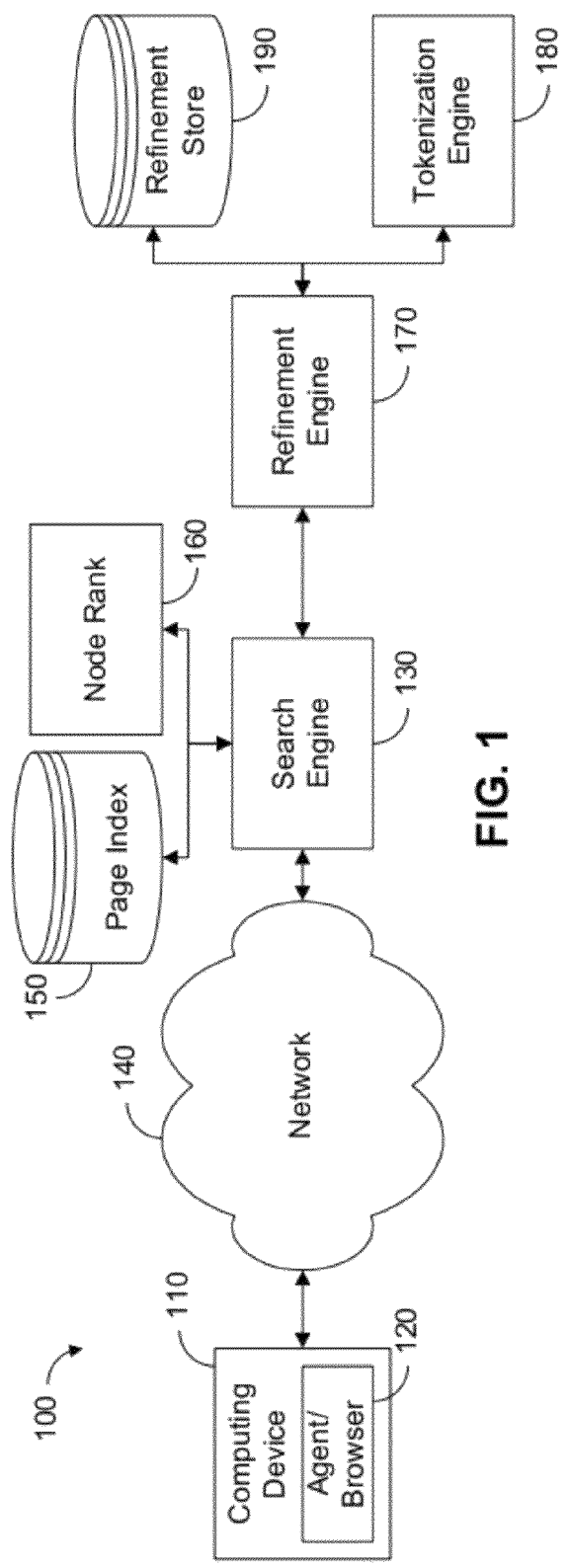
FIG. 1 is a block diagram of a network environment including an example contextual query refinement system.

FIG. 1 is a block diagram of a network environment 100 including an example contextual query refinement system. In the example of FIG. 1, the network environment 100 includes a computing device 110 with an agent/browser 120 operable to communicate with a search engine 130 over a network 140.

The agent/browser 120 can direct search queries comprising query strings to the search engine 130. The search engine 130 can include, for example, a page index 150 and a node rank engine 160. The page index 150 can be searched to determine which documents (e.g., web pages) are relevant to a submitted search query. The process of searching the page index 150 can result in a relevance score (e.g., an information retrieval (IR) score) that provides, for example, a percentage match of the query terms to the terms included in a document. Upon determining which pages are relevant to the submitted search query, the search engine can retrieve node rank information for the relevant pages from the node rank engine 160. The node rank information can be combined with the relevance information to determine which pages are most likely to satisfy a search query, both in terms of relevance and accuracy.

However, sometimes the original query does not result in identification of the information for which a user is searching. In such instances, the searcher can select the query string that initiated the query and change one or more words in the query string. Based upon the searcher selecting the query string, it can be inferred that the selection is an indication that the searcher desires to refine the previous search. Moreover, a refinement indication can be used to infer that the searcher may not know which search terms will lead to the most relevant result. As such, refinements can be provided to the searcher, for example, based upon the searcher's previous search query (e.g., refinements provided based upon context). In other examples, the refinement indication can also indicate which of the search terms are likely to be refined. Therefore, the position at which the searcher selects within the query string can be inferred to include additional context to the refinement indication, and the refinements, for example, can be based upon this additional context.

Refinement suggestions can be provided, for example, by a refinement engine 170 operating in conjunction with a tokenization engine 180 and a refinement store 190. The refinement engine 170 can use the context associated with a refinement indication to derive appropriate refinement suggestions from the refinement store 190. The refinement suggestions in various examples can be based upon any of a previous query string, a search term included within a previous query string, or combinations thereof. The refinement store 190 can provide a weighted list of refinements to each of the terms within the search query. The refinement engine 170 can retrieve a set of possible refinements from the refinement store 190. The refinements can then be processed to prepare the refinements for reordering or filtering before presentation of the refinements.

The query string can be converted, for example, into one or more tokens. For example, the query string may include multiple words that map to a single concept, (e.g., some cities, states or countries, among many others, can be described by multiple words (e.g., New York, The Hague, Sierra Leone, etc.)). In these instances, for example, it might be undesirable to separate the query string by words alone, since doing so could result in an ambiguous concept. For example, if a user entered Sierra Leone, and selected the word "Sierra," the refinement might not provide appropriate refinement indications based upon the context.

The conversion of the query string into tokens can be performed for example by a tokenization engine 180. The tokenization engine 180 can receive the query string and divide the query string into one or more tokens. Once the string is tokenized, the refinement engine 170 can define a map from tokens in the original query string to a set of refinements associated with the tokens in the original query string. The refinement engine 170, for example, can iterate over each of the refinements, and for each token from the original query string that is not present in the refinements, the current refinement can be added to the map value for the token.

In other examples, the refinement can be compared to the original query string to determine whether the refinement includes a common prefix or suffix to the original query string. For each word break in the region of overlap a vote can be recorded for the portion of the refinement that occurs after the break in the overlap region, and the portion of the refinement that occurs after the break in the overlap region can be mapped to the tokens in the original query string that occur after the break in the overlap region. For example, if the refinement "New Jersey beach home" is suggested for the original query string "New Jersey vacation rentals," the overlap region is "New Jersey." Thus, a vote can be recorded for dividing the original query string between "New Jersey" and "vacation rentals," and a mapping between "vacation rentals" and "beach home" can be recorded. Similarly, the overlap region can be divided between "New" and "Jersey vacation rentals," and one vote can be recorded for dividing the original query string between "New" and "Jersey vacation rentals," and a mapping can be added between "Jersey vacation rentals" and "Jersey beach home." In this example, the division point within the original query string that receives the most votes is the division point which is chosen for providing the refinements to the user.

A plurality of possible query refinements can be derived and provided with the search results, which can later be analyzed based on the refinement indication to provide contextual query refinements. In one implementation, the refinements can be computed before the results are served by the search engine. The refinements can then be inserted as metadata into a search results page that includes, for example, a listing of the search results. The search results page can include, for example, an agent that can receive a refinement indication from the searcher and parse the refinement indication to provide contextual query refinements based on the refinement indication and the metadata included with the search results page. In other examples, the refinements can be provided by the search engine 130 and refinement engine 170 after receiving a refinement indication from the searcher.

Figure 2:
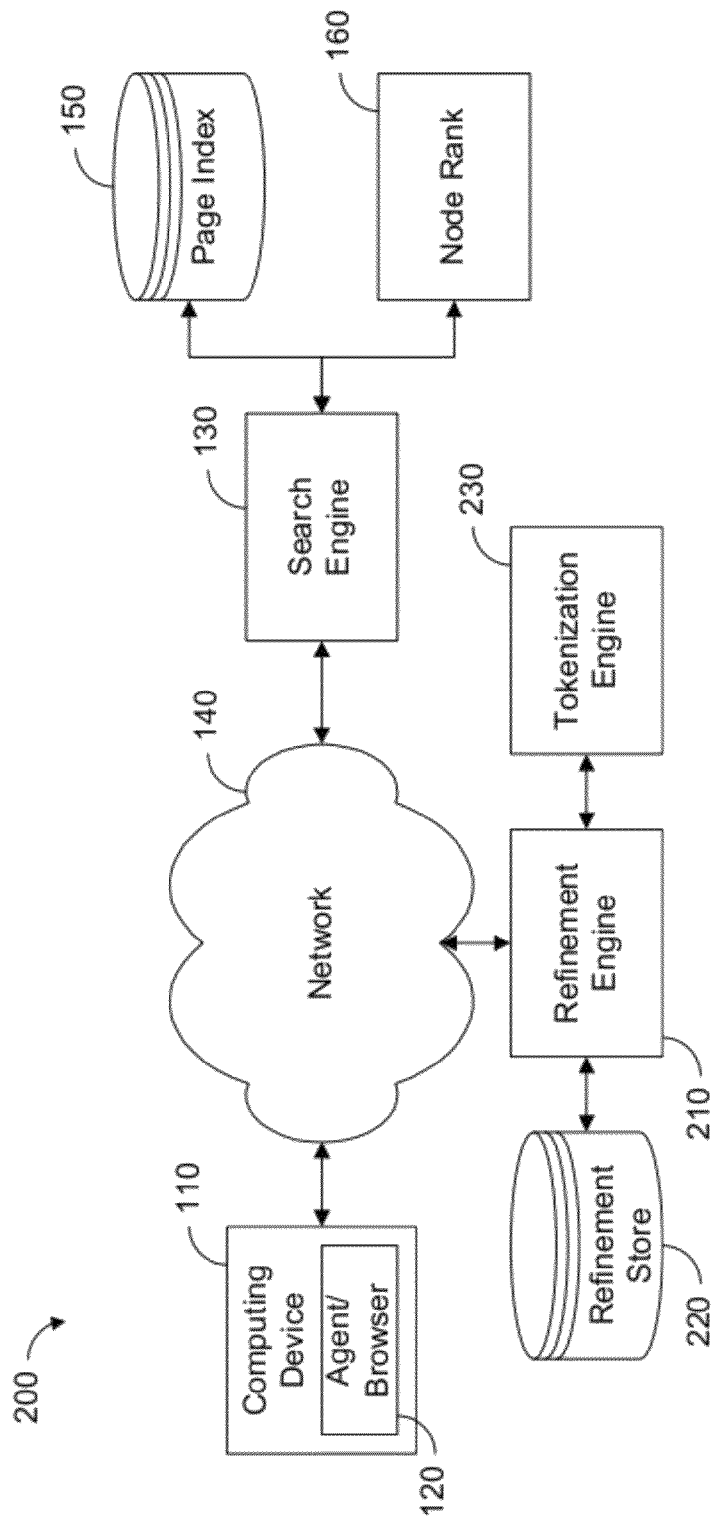
FIG. 2 is a block diagram of another network environment including another example contextual query refinement system.

FIG. 2 is a block diagram of another network environment 200 including another example contextual query refinement system. As discussed above, a computing device 110 having a browser/agent 120 can communicate with a search engine 130 over a network 140. The computing device 110 can provide a query string to the search engine using the browser/agent 120. The search engine 130 can provide search results, for example, based upon an IR score for the query derived from a page index 150. In various examples, node rank from a node rank store 160 can be used in conjunction with the IR score to sort the results.

In the example of FIG. 2, the refinement engine 210 is separated from the search engine 130. In some implementations, a browser or agent 120 operating on the computing device 110 could simultaneously, or subsequently (e.g., based on a refinement indication) request refinements from the refinement engine 210 upon submission of a query to the search engine 130. The refinement engine 210, for example, can retrieve refinements from a data store 220, tokenize the original query in conjunction with tokenization engine 230 and map the tokens to the refinements. In one example, tokens can be mapped to the refinements, for example, by determining the difference between the tokens in the original query string and the refinement. The difference is then mapped to the tokens that are not present in the refinement. For example, if "New Jersey beach home" is a possible refinement of "New Jersey vacation rentals," a mapping is added from the second token ("vacation") and the third token ("rentals") to the "New Jersey beach home" refinement.

The refinements indication can be received by the refinement engine 210 from a browser/agent 120 upon a detection that the searcher desires to refine the query. The refinement engine can provide, for example, refinements to the browser/agent, which can then be transmitted to the search engine 130 based upon user selection of a particular refinement. In some examples, the search engine can direct the browser/agent to the refinement engine upon detection of a refinement indication. In other examples, the computing device 110 may use an agent that operates in conjunction with the browser (e.g., a plug-in application) that communicates with the refinement engine upon detecting a refinement indication. Other variations of this network topology can also be used.

Figure 3:
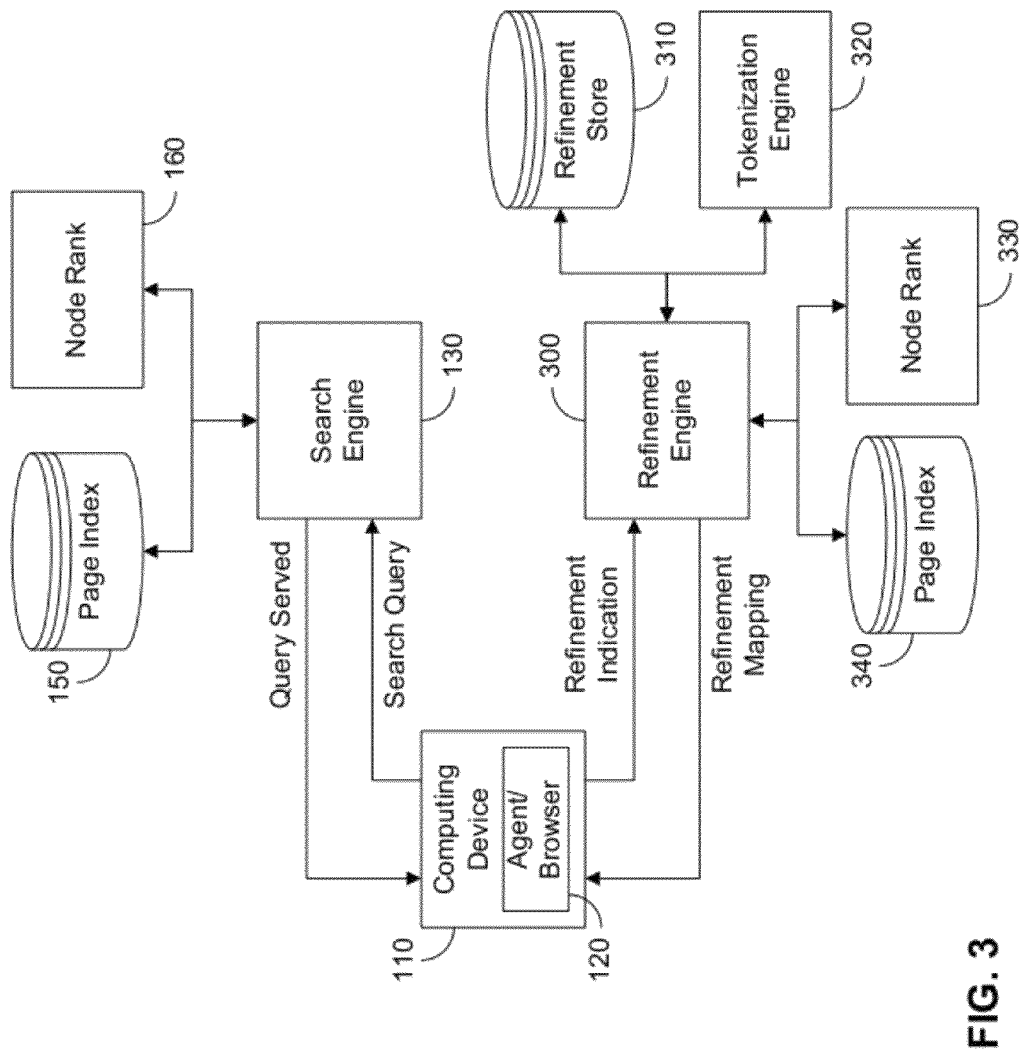
FIG. 3 is a block diagram illustrating an example contextual query refinement system configured to provide contextual query refinements to browsers.

FIG. 3 is a block diagram illustrating an alternative contextual query refinement system used to provide contextual query refinements to searchers. As discussed above, a refinement engine 300 can derive refinements based upon refinements from a refinement store 310 and based upon a tokenization engine 320 by mapping refinements to the tokens included in an original query. In some examples, the refinement engine 300 can also derive refinements based upon a page index 340 and a node rank engine 330.

In some examples, the refinement engine 300 can analyze the refinements and sort the refinements based upon relevance and node rank associated with the refinements. The relevance and node rank associated with the refinements can be aggregated to provide an indication of quality associated with the results of each of the identified refinements. Refinements that do not yield quality results, for example, can be assigned a priority lower than those refinements that yield quality results.

In other implementations, the refinement engine can examine statistics associated with queries received by the search engine and sort the refinements based upon the statistics (e.g., a popularity statistic) of the search queries associated with the refinements. Moreover, in further examples, existing suggestion algorithms can be used to derive the suggested refinements, while filtering those suggested refinements that do not correspond to the context provided by the refinement indications. Other refinement and/or suggestion processing can also be used.

FIGS. 4 and 5 are data structure diagrams illustrating potential tokenization, refinements and mappings for a search query. In the example shown in FIG. 4, the query string 400 is "New Jersey vacation rentals." As shown, the query string can be divided, for example, into tokens 410, 420 "New Jersey" and "vacation rentals." Each of the tokens 410, 420 can be mapped to one or more refinements, shown in this example as tree structures 430, 440, respectively. The "New Jersey" token 410, for example, could be mapped to other states.

As an example, the "New Jersey" token 410, in this example, is shown as being mapped to "New York," "Pennsylvania," "Connecticut," "Delaware" and "Rhode Island." As should be recognized, in the example of FIG. 4, the "New Jersey" token 410 is mapped to states near New Jersey since searchers looking for "New Jersey" related results can be inferred to be more interested in areas near New Jersey than in Florida, Texas or Washington. Moreover, in further examples, the search results can be filtered by popularity of similar searches to the query string in nearby states. In further examples, the refinements can be weighted, sorted and/or filtered based upon context associated with a refinement indication.

In the example of FIG. 5, the query string 500 is "New Jersey vacation rentals." The "New Jersey vacation rentals" query string 500 of FIG. 5 is divided into three tokens 510, 520, 530, "New Jersey," "vacation" and "rentals." Each of the tokens 510, 520, 530 can be mapped to one or more refinements, shown in this examples as tree structures 540, 550, and 560. The "New Jersey" tree structure 540 can include the refinements "New York," "Pennsylvania," "Connecticut," "Delaware," and "Rhode Island," for example. The "vacation" tree structure 550 can include the refinements "holiday," "trip," "beach," "recreation," and "break," for example. The "rental" tree structure 560 can include the refinements "homes," "timeshares," "apartments," "condos," and "hotels," for example.

The search refinements can be provided to the user based upon a context associated with a refinement indication received from a user. Moreover, in another implementation, the search refinements can be filtered, for example, by popularity of similar searches to the query string. In other implementations, the refinements can be weighted, sorted and/or filtered based upon context associated with a refinement indication.

FIGS. 6-11 are partial screen shots illustrating example environments that can be used to detect context for a search refinement and to provide contextual query refinements to a user. In the example of FIG. 6, the partial screen shot 600 includes a search field representation 610 and a search button representation 620. The search field representation 610, for example, can be used to enter a query string. The search button representation 620, for example, can be used to communicate a search query comprising the query string to a search engine.

Selection of a portion of the search field representation 610 using a mouse pointer representation 630, can indicate, for example, a desire to refine the query string. In the example shown in FIG. 6, when the searcher hovers the mouse pointer representation 630 over a portion of the search field representation 610, a refinements list representation 640 is displayed to the user. In another implementation, when the user selects (e.g., clicks) on a portion of the search field representation 610, a refinements list representation 640 can be displayed to the user. The refinement list representation 640, for example, can be based on the portion of the search field representation 610 over which the user is hovering the mouse pointer representation 630. In the example of FIG. 6, the refinement list representation 640 includes only the portion of the refinement which differs from the original query. The user can select one of the refinements from the refinement list, for example, by selecting the desired refinement using the mouse pointer representation 630. In some examples, the user can select a refinement by manually entering the refinement into the search field representation 610 using an I/O device (e.g., a keyboard) and selecting a search button representation 620.

In another implementation, the entire refinement can be displayed to the searcher. For example, FIG. 7 depicts a screen shot 700, in which the search field representation 710 is being hovered over by the mouse pointer representation 730 to produce a refinement list representation 740. The refinement list representation 740 of FIG. 7 displays entire refinement strings, thereby enabling the user to be more certain of the query being selected. A refinement can be selected for example, by moving the mouse pointer representation over the desired refinement and selecting the refinement.

In some examples, selection of a refinement can cause a query to be transmitted to a search engine. In other examples, selection of a refinement merely replaces the original search query in the search field representation 710, and the user can select to transmit the query by selecting the search button representation 720 using the mouse pointer representation.

Additional refinements can be obtained by hovering the mouse pointer representation 740 over the replacement query string. In the example shown in FIG. 8, the mouse pointer representation 830 is hovered over a different token in the search field representation 810. Thus, a refinement list representation 840 shown to the user includes refinements of an original search query associated with a first token. Therefore, hovering over the "New York" token of the query string, in this example, produces refinements included in the mapping 430, 540 (FIGS. 4 and 5, respectively). In another implementation, the entire refinement string can be displayed in the refinement list representation 840 (e.g., as shown in FIG. 7).

Figure 9:
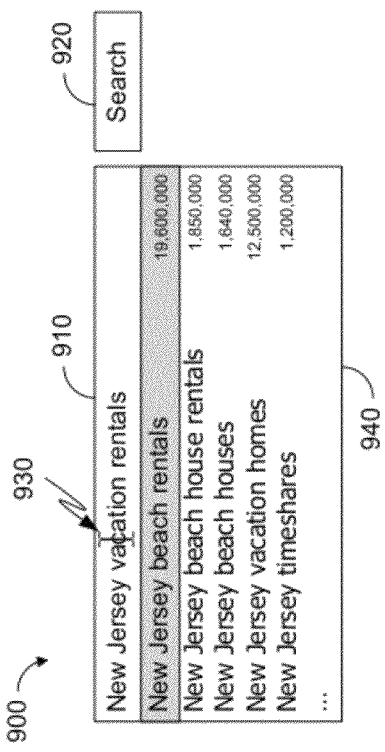

In other example implementations, the searcher can select a portion of the original query string. As shown in FIG. 9, a search field representation 910 can be selected, causing a cursor representation 930 to be displayed within the search field representation 910. Based upon, for example the selection of the search field representation and position of the selection in the search field representation, a refinement list representation 940 can be displayed to the searcher. In some examples, the refinement list representation 940 can be displayed to the searcher in the form of a drop-down list. The searcher can use an I/O device (e.g., keyboard, mouse, etc.) to select a refinement from the refinement list representation 940. Upon selection of a refinement, in some examples, an agent can cause a search query to be sent to a search engine. In other examples, selection of a refinement merely replaces the original query with the refinement. Selection of the refinement, in some examples, can result in further suggested refinements. A searcher can select the search button representation to cause an agent to communicate a search query comprising the query string to a search engine.

Figure 10:
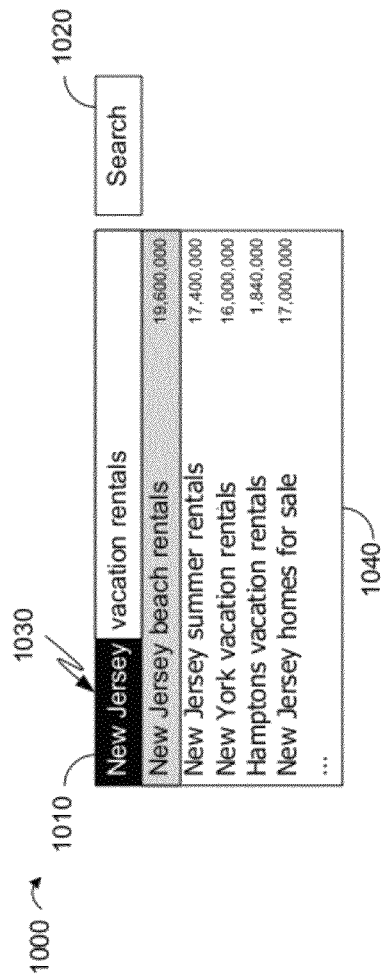

In another implementation, the searcher can highlight a portion of the original query string. As shown in the partial screen shot 1000 of FIG. 10, a search field representation 1010 can be highlighted 1030 by the searcher using an I/O device (e.g., a mouse, keyboard, etc.). An agent, for example, operating upon a computer associated with the searcher can interpret the highlighting of the search term as a refinement indication. As shown in FIG. 10, the context of the refinement indication indicates a refinement of the search term "New Jersey." The agent, for example, can then operate to provide suggested query string refinements to the user in the form of a refinements list representation 1040. In some implementations, the agent only suggests refinements to the selected token. However, in other implementations, such as shown in FIG. 10, the agent suggests refinements to each of the tokens included in the original query string. As disclosed above, the refinements can be sorted by popularity of the search, by relevance to the initial query string, number of web pages relevant to each of the refinement query string, etc.

FIG. 11 is a flowchart illustrating an example method for providing contextual query refinements to a user. At stage 1100 a search query is received. The search query can be received for example by a search engine (e.g., search engine 130 of FIG. 1) or by a refinement engine (e.g., refinement engine 170 of FIG. 1). The search query can be transmitted, for example, by an agent or browser (e.g., agent/browser 120 of FIG. 1) operating on a computing device (e.g., computing device 110 of FIG. 1) through a network (e.g., network 140 of FIG. 1). The search query can include one or more search terms entered by a searcher associated with the agent or browser.

At stage 1110, refinements for the query are retrieved. The refinements can be retrieved, for example, by a refinement engine (e.g., refinement engine 170 of FIG. 1) from a refinement store (e.g., refinement store 190). The refinements can include alternative search terms related to the search terms included in the search query. In some examples, the refinements can be weighted, for example, based on a strength of association with the search terms included in the search query. In other examples, all refinements associated with the search string can be retrieved.

At stage 1120, the refinements are processed for filtering and/or reordering. The refinements can be processed, for example, by a refinement engine (e.g., refinement engine 170). The refinements can be processed such that the refinements can be reordered and/or filtered at the time of presentation based upon a context associated with a refinement indication received from a searcher. In some implementations, the refinements associated with the search string are not filtered, but can be reordered based on context associated with any refinement indication. In additional implementations, the refinements can be limited to a maximum number of refinements which are processed for filtering and/or reordering.

At stage 1130, the results of the query are served with a refinement mapping. The query can be served with a refinement mapping, for example, by a search engine (e.g., search engine 130 of FIG. 1) in conjunction with a refinement engine (e.g., refinement engine 170 of FIG. 1). The refinement data can be embedded within the web page along with, for example, an agent to be executed when the search results page is loaded by a browser. The refinement mapping can therefore be transmitted, for example, as metadata. Upon receiving a refinement indication through a web browser interface, the agent can produce a list of suggested refinements based upon the refinement indication.

In some implementations, stage 1130 can further include serving the results of the query with a refinement mapping and search results associated with the refinement mappings. Serving the results of the query with a refinement mapping and search results can be provided, for example, by a search engine (e.g., search engine 130 of FIG. 1) in conjunction with a refinement engine (e.g., refinement engine 170 of FIG. 1). In such implementations, the search results can be displayed, for example, using a cascaded drop down menu upon selection (e.g., hover, click, etc.) of a refinement. Selection of a search result can cause an agent/browser (e.g., agent/browser 120 of FIG. 1) to issue a URL request based on the selected search result.

FIGS. 12 is a flowchart illustrating an example method for providing contextual query refinements to a user. At stage 1200, a refinement indication is received. The refinement indication can be received for example by an agent and/or browser (e.g., agent/browser 120 of FIG. 1) operating upon a computing device (e.g., computing device 110 of FIG. 1) associated with a searcher.

In one implementation, the agent can be executed upon loading a search page, or a search results page. However, in other implementations, the agent can be a plug-in application operating in conjunction with the browser. The agent can be programmed to recognize search pages and to provide information about search queries to a refinement engine in the background while a searcher is searching a subject. Upon detecting a refinement indication through the browser, the agent can provide suggestions to the searcher based upon the context of a refinement indication.

At stage 1210, refinement data is retrieved. The refinement data can be retrieved, for example, by an agent or browser (e.g., agent/browser 120 of FIG. 1). In one implementation, the refinement data can be retrieved, for example, from metadata embedded within a search results page. In another implementation, the refinement data can be retrieved by the agent or the browser from a refinement engine (e.g., refinement engine 210 of FIG. 2).

At stage 1220, the refinement data is processed based on context. The refinement can be processed, for example, by an agent or browser (e.g., agent/browser 120) operating on a computing device (e.g., computing device 110 of FIG. 1). The refinement data can be processed, for example, for reordering and/or filtering based on context associated with a refinement indication. The refinements can be reordered, for example, according to any algorithm preferred by the searcher or programmer. In some examples, the refinements can be reordered based on popularity of a search query, strength of association between the refinements and the original query, the quality of the search results associated with a refinement, etc.

At stage 1230, the processed refinements are displayed. The processed refinements can be displayed, for example, by a computing device (e.g., computing device 110 of FIG. 1) in conjunction with an agent or browser (e.g., agent/browser 120 of FIG. 1) operating on the computing device. The refinements can be displayed in any of these variety of configurations.

FIG. 13 is a flowchart illustrating an alternative example methods for providing contextual query refinements to a user. At stage 1300, a search query is received. The search query can be received, for example, by a search engine (e.g., search engine 130 of FIG. 1) or by a refinement engine (e.g., refinement engine 170 of FIG. 1). The search query can be transmitted, for example, by an agent or browser (e.g., agent/browser 120 of FIG. 1) operating on a computing device (e.g., computing device 110 of FIG. 1) through a network (e.g., network 140 of FIG. 1). The search query can include one or more search terms entered by a searcher associated with the agent or browser.

At stage 1310, the search query can be tokenized. The search query can be tokenized, for example, by a tokenization engine (e.g., tokenization engine 180 of FIG. 1). The tokenization engine can divide the search query into one or more concepts included within the search query. The concepts can be divided, for example, by any of a plurality of tokenization algorithms programmed to group search terms together into a single token, and/or to separate search terms into multiple tokens.

At stage 1320, the tokens can be used to derive refinements. The tokens can be used to derive refinements, for example, by a refinement engine (e.g., refinement engine 170 of FIG. 1). The refinements can be search terms that have been identified to be similar to the tokens which have been inferred to be the subject of a refinement indication based on the context of the search.

At stage 1330, the refinement data can be appended (e.g., embedded within) to corresponding search results. The refinements can be embedded within the search results, for example, by a search engine (e.g., search engine 130 of FIG. 1) operating in conjunction with a refinement engine (e.g., refinement engine 170 of FIG. 1). The refinement data can be embedded within the web page along with, for example, an agent to be executed when the search results page is loaded by a browser. The refinement mapping can therefore be transmitted, for example, as metadata. Upon receiving a refinement indication through a web browser interface, the agent can produce a list of suggested refinements based upon the refinement indication.

Figure 14:
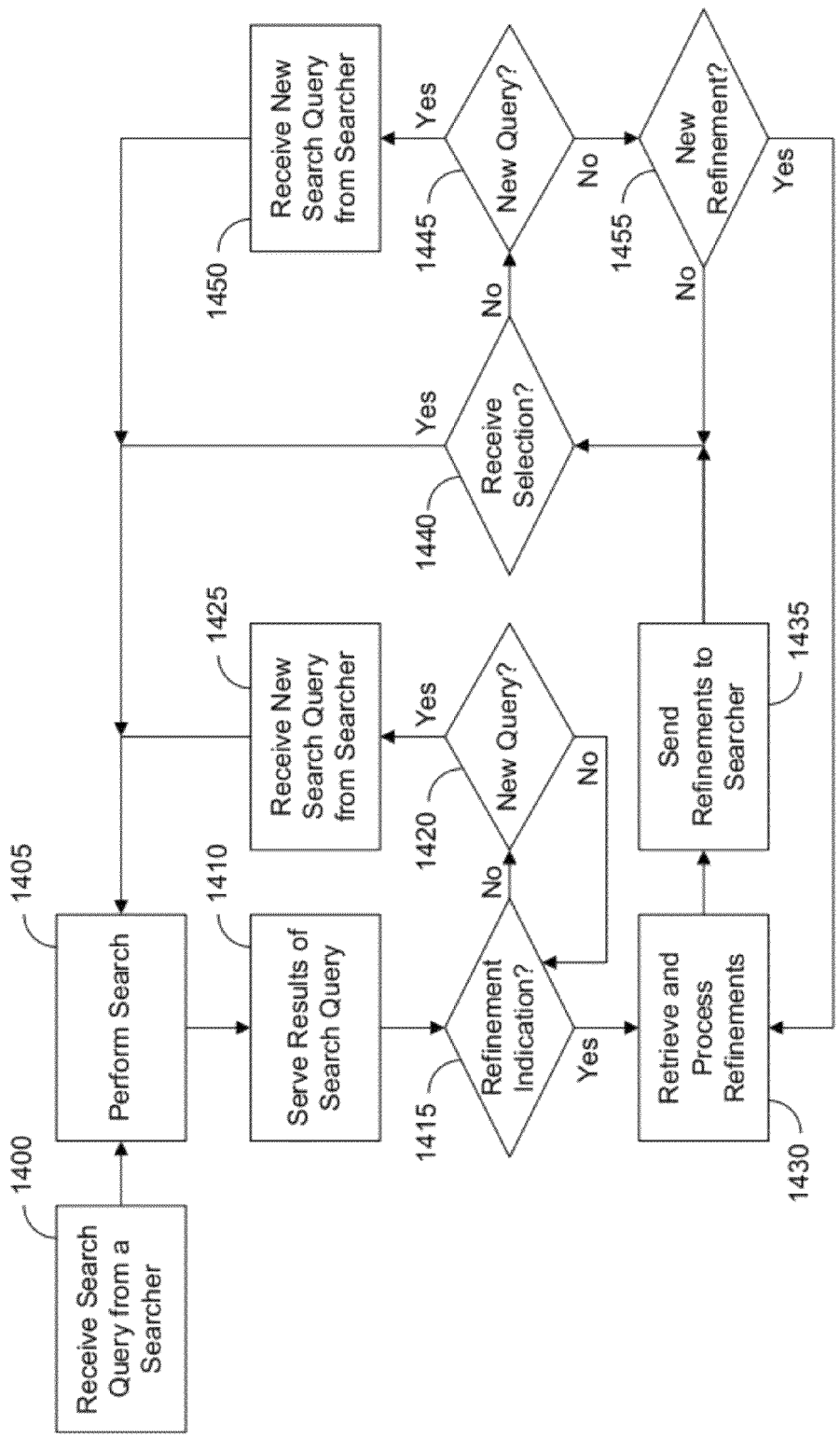

FIG. 14 is a flowchart illustrating an alternative example method for providing contextual query refinements to a user. At stage 1400, a search query is received from a searcher. The search query can be received, for example, by a search engine (e.g., search engine 130 of FIG. 1) in communication with a computing device (e.g., computing device 110 of FIG. 1) executing an agent or browser application (e.g., agent/browser 120 of FIG. 1).

At stage 1405, a search is performed. The search can be performed, for example, by a search engine (e.g., search engine 130 of FIG. 1) operating in conjunction with, for example, a page index store (e.g., page index 150 of FIG. 1) and/or a node rank engine (e.g., node rank engine 160 of FIG. 1). The search can be performed based upon the search query received from the user. The search engine, in some examples, uses the page index to derive an IR score and combines the IR score with a node rank for each of the relevant pages to derive search results.

At stage 1410, the search query can be served. The search query can be served, for example, by a search engine (e.g., search engine 130 of FIG. 1) through a network (e.g., network 140 of FIG. 1) to an agent or browser (e.g., agent/browser 120 of FIG. 1) operating on a computing device (e.g., computing device 110 of FIG. 1).

At stage 1415, a determination is made whether a refinement indication has been received. The determination can be made by a search engine (e.g., search engine 130 of FIG. 1) in conjunction with an agent or browser (e.g., agent/browser 120 of FIG. 1) operating upon a computing device (e.g., computing device 110 of FIG. 1). If there has been no refinement indication, the method proceeds to stage 1420 to make a determination as to whether a new query has been received. The determination of whether a new query has been received can be made, for example, by a search engine (e.g., search engine 130 of FIG. 1). The new search query is received at stage 1425. The new search query can be received, for example, by a search engine (e.g., search engine 130 of FIG. 1). Upon receiving a new search query, a search is performed using the new search query at stage 1405.

Returning to stage 1420, if no new query is received, the method waits for a refinement indication or a new search query. Upon receiving a refinement indication at stage 1415, refinements for the query can be retrieved and processed. The refinements can be retrieved and processed, for example, by a refinement engine (e.g., refinement engine 170 of FIG. 1).

At stage 1435, the refinements are sent to the searcher. The refinements can be sent to the searcher, for example, by a refinement engine (e.g., refinement engine 170 of FIG. 1). At stage 1440, it is determined whether a selection of one of the refinements has been received. The selection of one of the refinements can be received, for example, by a search engine (e.g., search engine 130 of FIG. 1). Upon receipt of a refinement indication, a search can be performed based on the refinements.

However, if no refinement indication is received at stage 1440, the method proceeds to stage 1445, and a determination of whether a new query has been received is made. The determination of whether a new query has been received can be made, for example, by a search engine (e.g., search engine 130 of FIG. 1). The new search query is received at stage 1450. The new search query can be received, for example, by a search engine (e.g., search engine 130 of FIG. 1). Upon receiving a new search query, a search is performed using the new search query at stage 1405.

Alternatively, if a no new query is received, the method proceeds to stage 1455, where it is determined whether a new refinement indication has been received. The determination of whether a new refinement indication is received can be provided, for example, by a refinement engine (e.g., refinement engine 170 of FIG. 1). If a new refinement indication is received, the method proceeds to stage 1430, to derive and process new refinements. However, if no new refinement indication is received, the method waits until any of a refinement selection, new query or new refinement indication are received.

Systems and methods disclosed herein may use data signals conveyed using networks (e.g., local area network, wide area network, internet, etc.), fiber optic medium, carrier waves, wireless networks, etc. for communication with one or more data processing devices (e.g., computing device 110, web server 130, etc.). The data signals can carry any or all of the data disclosed herein that is provided to or from a device.

The methods and systems described herein may be implemented on many different types of devices including processing devices in hardware, software or combinations of both. Processing can be controlled by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The device components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A method executed by a data processing apparatus, comprising:
    detecting a query refinement indication associated with a search query, the search query comprising a plurality of query tokens and a plurality of word breaks separating the query tokens;
    identifying a plurality of query refinements based on the query tokens in the search query, each of the query refinements being a query other than the search query, wherein each of the query refinements comprises a plurality of terms;
    calculating a score for each of the query refinements based on overlaps between the query refinement and the query tokens, the calculating comprising:
        generating multiple divisions of the search query, each division of the search query separating the query tokens at a distinct word break such that the search query is divided into an overlap region and a non-overlap region, wherein each query token in the overlap region overlaps one or more terms in the query refinement; and
        incrementing the score of the query refinement for each word break in the overlap region in each division of the search query; and
    providing for display one or more of the query refinements as query suggestions according to the scores and the query refinement indication.

2. The method of claim 1, wherein the overlap region is a portion of the search query located before or after the division.

3. The method of claim 1, wherein providing one or more of the query refinements as query suggestions for display according to the scores and the query refinement indication comprises:
    ordering the query refinements based on the scores of the query refinements; and
    selecting the query refinements for display according to the ordering.

4. The method of claim 1, wherein the query refinement indication includes an indication of a user selection of at least one of the query tokens, the user selection including less than all of the query tokens.

5. The method of claim 4, wherein providing for display the one or more of the query refinements as query suggestions according to the scores and the query refinement indication comprises:
    selecting the one or more of the query refinements based on a match between unselected query tokens and a portion of each of the query refinements.

6. The method of claim 5, wherein providing for display the one or more of the query refinements as query suggestions according to the scores and the query refinement indication comprises:
    providing for display the one or more of the query refinements as a list, wherein the portions of the query refinements that match the unselected query token are excluded from the list.

7. The method of claim 4, further comprising detecting the user selection, including determining that a mouse pointer hovers over the at least one of the tokens in a search input field.

8. A computer program product tangibly stored on a non-transitory storage device and operable to cause one or more computers to perform operations comprising:
    detecting a query refinement indication associated with a search query, the search query comprising a plurality of query tokens and a plurality of word breaks separating the query tokens;
    identifying a plurality of query refinements based on the query tokens in the search query, each of the query refinements being a query other than the search query, wherein each of the query refinements comprises a plurality of terms;
    calculating a score for each of the query refinements based on overlaps between the query refinement and the query tokens, the calculating comprising:
        generating multiple divisions of the search query, each division of the search query separating the query tokens at a distinct word break such that the search query is divided into an overlap region and a non-overlap region, wherein each query token in the overlap region overlaps one or more terms in the query refinement; and
        incrementing the score of the query refinement for each word break in the overlap region in each division of the search query; and
    providing for display one or more of the query refinements as query suggestions according to the scores and the query refinement indication.

9. The product of claim 8, wherein the overlap region is a portion of the search query located before or after the division.

10. The product of claim 8, wherein providing one or more of the query refinements as query suggestions for display according to the scores and the query refinement indication comprises:
    ordering the query refinements based on the scores of the query refinements; and
    selecting the query refinements for display according to the ordering.

11. The product of claim 8, wherein the query refinement indication includes an indication of a user selection of at least one of the query tokens, the user selection including less than all of the query tokens.

12. The product of claim 11, wherein providing for display the one or more of the query refinements as query suggestions according to the scores and the query refinement indication comprises:
    selecting the one or more of the query refinements based on a match between unselected query tokens and a portion of each of the query refinements.

13. The product of claim 12, wherein providing for display the one or more of the query refinements as query suggestions according to the scores and the query refinement indication comprises:

> providing for display the one or more of the query refinements as a list, wherein the portions of the query refinements that match the unselected query token are excluded from the list.

14. The product of claim 11, the operations further comprising detecting the user selection, including determining that a mouse pointer hovers over the at least one of the tokens in a search input field.

15. A system, comprising:

> one or more computers configured to perform operations comprising:
>
>> detecting a query refinement indication associated with a search query, the search query comprising a plurality of query tokens and a plurality of word breaks separating the query tokens;
>> identifying a plurality of query refinements based on the query tokens in the search query each of the query refinements being a query other than the search query, wherein each of the query refinements comprises a plurality of terms;
>> calculating a score for each of the query refinements based on overlaps between the query refinement and the query tokens, the calculating comprising:
>>
>>> generating multiple divisions of the search query, each division of the search query separating the query tokens at a distinct word break such that the search query is divided into an overlap region and a non-overlap region, wherein each query token in the overlap region overlaps one or more terms in the query refinement; and
>>> incrementing the score of the query refinement for each word break in the overlap region in each division of the search query; and
>>
>> providing for display one or more of the query refinements as query suggestions according to the scores and the query refinement indication.

16. The system of claim 15, wherein the overlap region is a portion of the search query located before or after the division.

17. The system of claim 15, wherein providing one or more of the query refinements as query suggestions for display according to the scores and the query refinement indication comprises:

> ordering the query refinements based on the scores of the query refinements; and
> selecting the query refinements for display according to the ordering.

18. The system of claim 15, wherein the query refinement indication includes an indication of a user selection of at least one of the query tokens, the user selection including less than all of the query tokens.

19. The system of claim 18, wherein providing for display the one or more of the query refinements as query suggestions according to the scores and the query refinement indication comprises:

> selecting the one or more of the query refinements based on a match between unselected query tokens and a portion of each of the query refinements.

20. The system of claim 19, wherein providing for display the one or more of the query refinements as query suggestions according to the scores and the query refinement indication comprises:

> providing for display the one or more of the query refinements as a list, wherein the portions of the query refinements that match the unselected query token are excluded from the list.

21. The system of claim 18, the operations further comprising detecting the user selection, including determining that a mouse pointer hovers over the at least one of the tokens in a search input field.

\* \* \* \* \*